(12) United States Patent
Kusafuka et al.

(10) Patent No.: US 11,977,226 B2
(45) Date of Patent: May 7, 2024

(54) HEAD-UP DISPLAY SYSTEM AND MOVABLE BODY

(71) Applicant: KYOCERA Corporation, Kyoto (JP)

(72) Inventors: Kaoru Kusafuka, Tokyo (JP); Mitsuhiro Murata, Yao (JP); Sunao Hashimoto, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 17/780,402

(22) PCT Filed: Nov. 16, 2020

(86) PCT No.: PCT/JP2020/042683
§ 371 (c)(1),
(2) Date: May 26, 2022

(87) PCT Pub. No.: WO2021/106665
PCT Pub. Date: Jun. 3, 2021

(65) Prior Publication Data
US 2023/0004003 A1    Jan. 5, 2023

(30) Foreign Application Priority Data

Nov. 27, 2019    (JP) .................................. 2019-214697

(51) Int. Cl.
*G02B 27/01*    (2006.01)
*B60K 35/00*    (2006.01)
(Continued)

(52) U.S. Cl.
CPC .......... *G02B 27/0101* (2013.01); *B60K 35/00* (2013.01); *G02B 27/0149* (2013.01);
(Continued)

(58) Field of Classification Search
CPC .............. B60K 35/00; B60K 2370/148; B60K 2370/1529; B60K 2370/166; B60K 2370/167; B60K 2370/177; B60K 2370/21; B60K 2370/23; B60K 2370/31; B60K 2370/334; B60K 2370/347;
(Continued)

(56) References Cited

U.S. PATENT DOCUMENTS

2003/0231144 A1    12/2003  Cho et al.
2005/0154505 A1*    7/2005  Nakamura ............. G02B 27/01
                                          701/1
(Continued)

FOREIGN PATENT DOCUMENTS

CN    112513719 A    3/2021
EP    3528043 A1    8/2019
(Continued)

*Primary Examiner* — Amy Onyekaba
*Assistant Examiner* — Cory A Almeida
(74) *Attorney, Agent, or Firm* — Procopio, Cory, Hargreaves & Savitch LLP (57) ABSTRACT

A head-up display system includes a first projection module that projects a first image to display the first image in a forward direction not directly facing a user, a second projection module that projects a second image to display the second image in a forward direction directly facing the user, and a reflective optical element that reflects at least a part of the first image and at least a part of the second image.

14 Claims, 8 Drawing Sheets

(51) Int. Cl.
*G02B 30/26* (2020.01)
*G02B 30/32* (2020.01)
*G03B 21/26* (2006.01)
*G03B 21/28* (2006.01)
*G03B 35/24* (2021.01)
*G06F 3/16* (2006.01)
*G09G 3/00* (2006.01)
*H04N 13/363* (2018.01)

(52) U.S. Cl.
CPC .............. *G02B 30/26* (2020.01); *G02B 30/32* (2020.01); *G03B 21/26* (2013.01); *G03B 21/28* (2013.01); *G03B 35/24* (2013.01); *G06F 3/167* (2013.01); *G09G 3/001* (2013.01); *H04N 13/363* (2018.05); *B60K 2370/148* (2019.05); *B60K 2370/1529* (2019.05); *B60K 2370/166* (2019.05); *B60K 2370/167* (2019.05); *B60K 2370/21* (2019.05); *B60K 2370/23* (2019.05); *G02B 2027/0138* (2013.01); *G02B 2027/0154* (2013.01)

(58) Field of Classification Search
CPC ............ B60K 2370/35; B60K 2370/52; G02B 27/0101; G02B 27/0149; G02B 30/26; G02B 30/31; G02B 30/32; G02B 27/01; G02B 2027/0134; G02B 2027/9136; G02B 2027/0138; G02B 2027/0154; G02F 1/13306; G03B 21/26; G03B 21/28; G03B 35/24; G06F 3/167; G09G 3/001; H04N 13/31; H04N 13/363
See application file for complete search history.

(56) References Cited

U.S. PATENT DOCUMENTS

| | | |
|---|---|---|
| 2008/0259223 A1 | 10/2008 | Read et al. |
| 2010/0073636 A1 | 3/2010 | Sasaki et al. |
| 2014/0253821 A1 | 9/2014 | Takatoh et al. |
| 2015/0146270 A1* | 5/2015 | Huntzicker .............. G03H 1/26 359/13 |
| 2015/0226965 A1 | 8/2015 | Kim et al. |
| 2017/0155867 A1* | 6/2017 | Yokota ............... G02B 27/0093 |
| 2017/0161009 A1 | 6/2017 | Ogisu et al. |
| 2019/0025594 A1 | 1/2019 | Holmer et al. |
| 2019/0027039 A1* | 1/2019 | Takae .................... G08G 1/015 |
| 2019/0164461 A1 | 5/2019 | Tomioka |
| 2019/0227324 A1 | 7/2019 | Tachikawa et al. |
| 2019/0235234 A1 | 8/2019 | Hu et al. |
| 2019/0317322 A1* | 10/2019 | Hayakawa .............. B60K 35/00 |
| 2020/0074896 A1* | 3/2020 | Kusafuka ............... G02B 30/30 |
| 2020/0213560 A1* | 7/2020 | Zhang .................... G06V 40/70 |

FOREIGN PATENT DOCUMENTS

| | | |
|---|---|---|
| JP | 60-192912 A | 10/1985 |
| JP | 2001-136466 A | 5/2001 |
| JP | 2003-32329 A | 1/2003 |
| JP | 2004-29785 A | 1/2004 |
| JP | 2006-259043 A | 9/2006 |
| JP | 2007-279930 A | 10/2007 |
| JP | 2009-8722 A | 1/2009 |
| JP | 2010-72455 A | 4/2010 |
| JP | 2012-29169 A | 2/2012 |
| JP | 2015-41922 A | 3/2015 |
| JP | 2017-62448 A | 3/2017 |
| JP | 2018-200384 A | 12/2018 |
| JP | 2019-129398 A | 8/2019 |
| JP | 2019-133039 A | 8/2019 |
| JP | 2019-142276 A | 8/2019 |
| WO | 2013/058123 A1 | 4/2013 |
| WO | 2016/052186 A1 | 4/2016 |
| WO | 2018/025475 A1 | 2/2018 |
| WO | 2018/100377 A1 | 6/2018 |
| WO | 2018/142806 A1 | 8/2018 |
| WO | 2019/156030 A1 | 8/2019 |
| WO | 2020/022457 A1 | 1/2020 |

* cited by examiner

HEAD-UP DISPLAY SYSTEM AND MOVABLE BODY

FIELD

The present disclosure relates to a head-up display system and a movable body.

BACKGROUND

A known technique is described in, for example, Patent Literature 1.

CITATION LIST

Patent Literature

Patent Literature 1: Japanese Unexamined Patent Application Publication No. 2009-008722

BRIEF SUMMARY

A head-up display system according to one embodiment of the present disclosure includes a first projection module that projects a first image to display the first image in a forward direction not directly facing a user, a second projection module that projects a second image to display the second image in a forward direction directly facing the user, and a reflective optical element that reflects at least a part of the first image and at least a part of the second image.

A movable body according to one embodiment of the present disclosure includes a head-up display system. The head-up display system includes a first projection module that projects a first image to display the first image in a forward direction not directly facing a user, a second projection module that projects a second image to display the second image in a forward direction directly facing the user, and a reflective optical element that reflects at least a part of the first image and at least a part of the second image.

BRIEF DESCRIPTION OF DRAWINGS

The objects, features, and advantages of the present disclosure will become more apparent from the following detailed description and the drawings.

DETAILED DESCRIPTION

As a head-up display (HUD) with the structure that forms the basis of a HUD system according to one or more embodiments of the present disclosure, a known HUD system causes images having parallax between them to reach the left and right eyes of a user and projects a virtual image in the field of view of the user to be viewed as a three-dimensional (3D) image with depth.

The HUD system may be, for example, mounted on a movable body. However, its known application has been, for example, a navigation system.

In response to the above issue, one or more aspects of the present disclosure are directed to a HUD system and a movable body for displaying a wide variety of display items.

One or more embodiments of the present disclosure will now be described with reference to the drawings. The drawings used herein are schematic and are not drawn to scale relative to the actual size of each component.

Head-Up Display System

Figure 1:
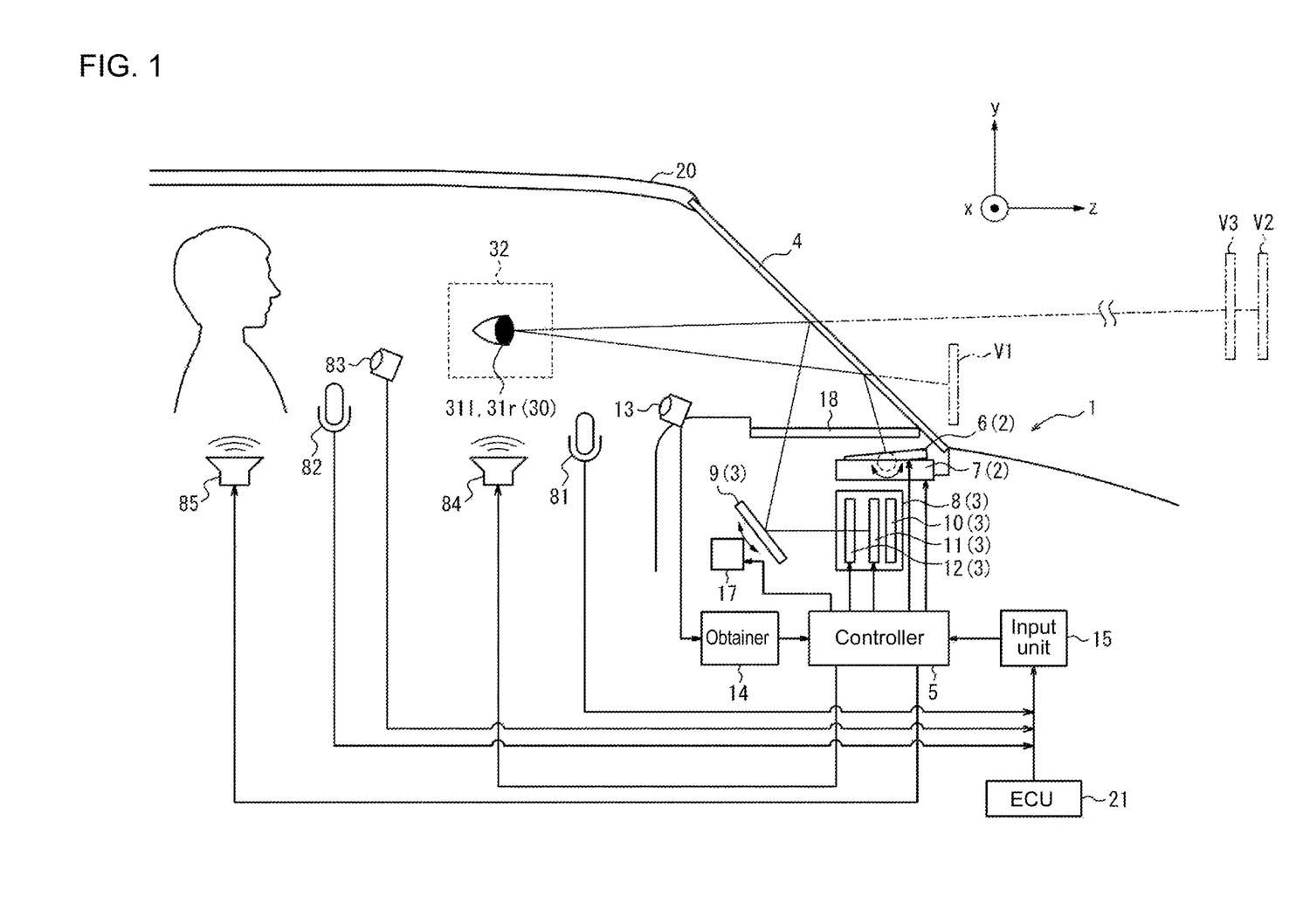
FIG. 1 is a schematic diagram of an example head-up display (HUD) system mounted on a movable body.

As shown in FIG. 1, a head-up display system 1 according to an embodiment of the present disclosure includes a first projection module 2, a second projection module 3, a reflective optical element 4, a microphone, a camera 83, and a controller 5. In the present embodiment, the microphone includes a first microphone 81 and a second microphone 82. The microphone may not include multiple microphones but may be the first microphone 81 alone that detects, for example, the voice of a user 30.

The head-up display system 1 is hereafter also referred to as a HUD system 1. The HUD system 1 may be mounted on a movable body 20. The HUD system 1 mounted on the movable body 20 displays an image for the user 30 aboard the movable body 20. An image projected by the first projection module 2 is referred to as a first image. An image projected by the second projection module 3 is referred to as a second image.

FIG. 1 shows the HUD system 1 mounted on the movable body 20. In FIG. 1, x-direction refers to an interocular direction of the user 30, or the direction along a line passing through a left eye 31l and a right eye 31r of the user 30, z-direction refers to the front-rear direction as viewed from the user 30, and y-direction refers to the height direction orthogonal to x-direction and z-direction.

The movable body according to one or more embodiments of the present disclosure includes a vehicle, a vessel, or an aircraft. The vehicle according to one or more embodiments of the present disclosure includes, but is not limited to, an automobile or an industrial vehicle, and may also include a railroad vehicle, a community vehicle, or a fixed-wing aircraft traveling on a runway. The automobile includes, but is not limited to, a passenger vehicle, a truck, a bus, a motorcycle, or a trolley bus, and may also include another vehicle traveling on a road. The industrial vehicle includes an agricultural vehicle or a construction vehicle. The industrial vehicle includes, but is not limited to, a forklift or a golf cart. The agricultural vehicle includes, but is not limited to, a tractor, a cultivator, a transplanter, a binder, a combine, or a lawn mower. The construction vehicle includes, but is not limited to, a bulldozer, a scraper, a power shovel, a crane vehicle, a dump truck, or a road roller. The vehicle includes a man-powered vehicle. The classification of the vehicle is not limited to the above examples. For example, the automobile may include an industrial vehicle traveling on a road, and one type of vehicle may fall within a plurality of classes. The vessel according to one or more embodiments of the present disclosure includes a jet ski, a boat, or a tanker. The aircraft according to one or more embodiments of the present disclosure includes a fixed-wing aircraft or a rotary-wing aircraft.

First Projection Module

The first projection module 2 includes a first display panel 6. The first display panel 6 projects an image displayed on the first display panel 6. The first display panel 6 may include a flat display panel selected from a liquid crystal display (LCD), an organic electroluminescent (EL) display, an inorganic EL display, a plasma display panel (PDP), a field-emission display (FED), an electrophoresis display, and a twisting-ball display.

In the present embodiment, the first display panel 6 emits image light linearly toward the reflective optical element 4 as shown in FIG. 1. The image light reflected by the reflective optical element 4 reaches the left eye 31l and the right eye 31r of the user 30. This causes the user 30 to view a first virtual image V1 of the first display panel 6 reflected by the reflective optical element 4.

The first projection module 2 may further include a stage 7 on which the first display panel 6 is mountable. The stage 7 can move or orient the first display panel 6 with respect to the reflective optical element 4. This causes the first projection module 2 to change the position at which the first image is projected on the reflective optical element 4. The first display panel 6 may be located on the surface of a dashboard in the movable body 20.

Second Projection Module

The second projection module 3 includes a display device 8 and an optical system 9. The display device 8 includes an illuminator 10 and a second display panel 11. The second projection module 3 projects an image displayed on the second display panel 11.

The display device 8 emits image light from the second image displayed on the second display panel 11. For the second projection module 3 that can project a parallax image viewable as a 3D image to the user 30, the display device 8 may further include a parallax optical element 12. For the second projection module 3 that projects an image viewable as a two-dimensional (2D) image alone to the user 30, the parallax optical element 12 may be eliminated. The structure including the second projection module 3 that can display a parallax image will be described in detail later.

The optical system 9 causes image light from the second image emitted by the display device 8 to travel toward the reflective optical element 4. The optical system 9 may have a predetermined positive refractive index. The optical system 9 with a predetermined positive refractive index causes the second image on the second display panel 11 to be projected as an enlarged virtual image at a position farther than the reflective optical element 4 in the field of view of the user 30. The optical system 9 may include a mirror. The mirror included in the optical system 9 may be a concave mirror.

The illuminator 10 illuminates the second display panel 11 with planar illumination light. The illuminator 10 may include a light source, a light guide plate, a diffuser plate, and a diffuser sheet. The illuminator 10 spreads illumination light emitted from its light source uniformly to illuminate the surface of the second display panel 11. The illuminator 10 can emit illumination light to be substantially uniform through, for example, the light guide plate, the diffuser plate, and the diffuser sheet. The illuminator 10 may emit the uniform light toward the second display panel 11.

The second display panel 11 may be, for example, a transmissive liquid crystal display panel. The second display panel 11 is not limited to a transmissive liquid crystal panel but may be a self-luminous display panel. The self-luminous display panel may be, for example, an organic EL display or an inorganic EL display. For the second display panel 11 being a self-luminous display panel, the display device 8 may not include the illuminator 10.

The second projection module 3 may further change at least either the position or the orientation of at least one component included in the optical system 9. The second projection module 3 may include a drive 17 for changing the position or the orientation of at least one component included in the optical system 9. The drive 17 may include, for example, a stepper motor. For example, the drive 17 can change the tilt of the mirror included in the optical system 9. The controller 5 may control the drive 17. The drive 17 drives the second projection module 3 to change the position at which the second image is projected on the reflective optical element 4.

The HUD system 1 may include a glass cover 18 for protecting the first projection module 2 and the second projection module 3 between the reflective optical element 4 and the first and second projection modules 2 and 3. The glass cover 18 may be a flat glass plate or a curved glass plate. The first projection module 2 and the second projection module 3 may have their optical paths for image light from the first image and the second image at least partially overlapping the glass cover 18. The glass cover 18 with this structure can be small, and the entire HUD system 1 can also be small.

Reflective Optical Element

The reflective optical element 4 reflects at least a part of an image. In the present embodiment, images that are reflected by the reflective optical element 4 include the first image and the second image.

The reflective optical element 4 reflects, toward a viewing zone 32 of the user 30, image light from the first image emitted from the first projection module 2 and image light from the second image emitted from the second projection module 3. The HUD system 1 mounted on the movable body 20 being a vehicle may use a windshield of the vehicle as the reflective optical element 4.

Figure 2:
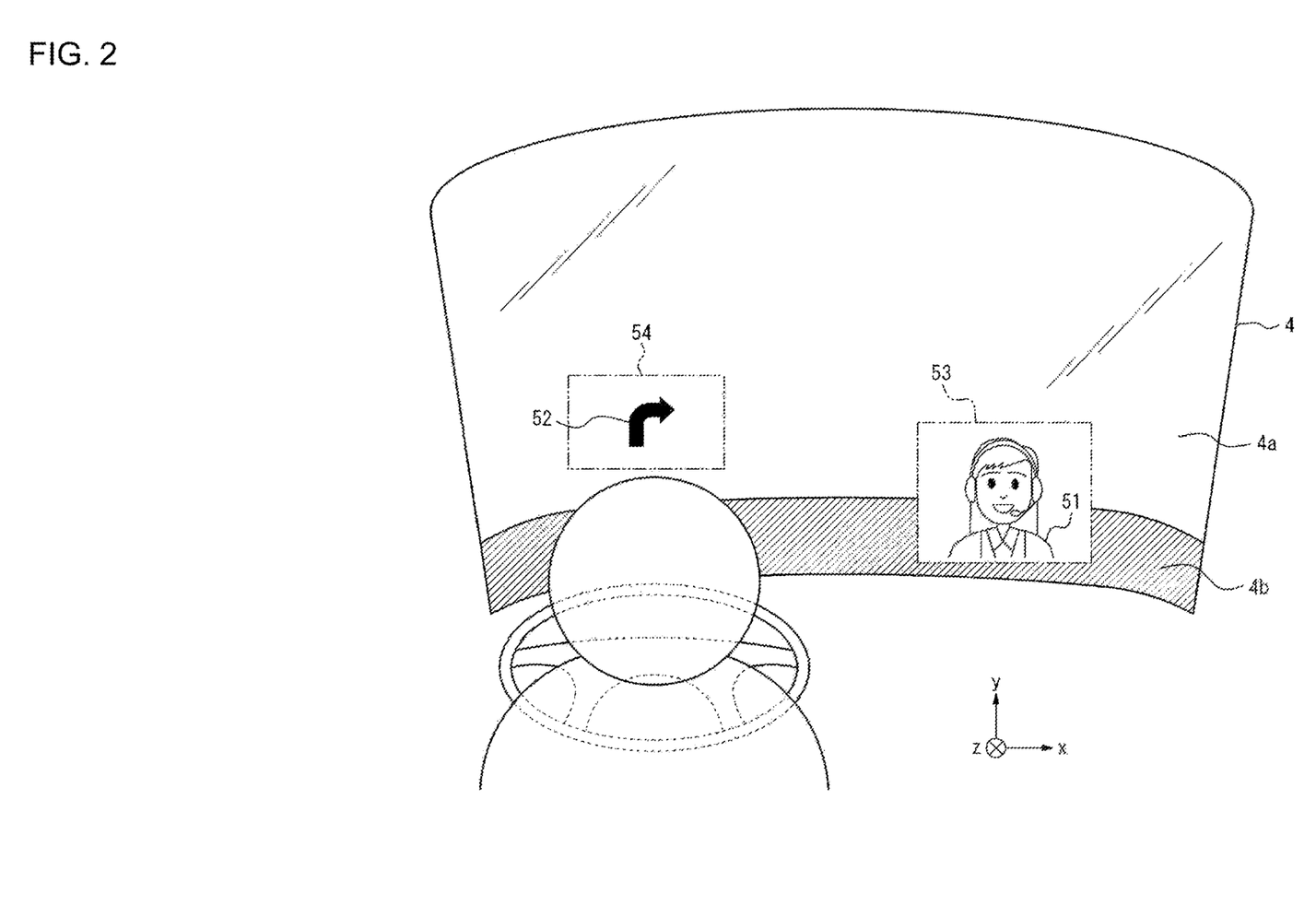
FIG. 2 is a diagram of an example display performed by a HUD in FIG. 1.

With the first projection module 2 and the second projection module 3 in operation, the reflective optical element 4 can cause a first image 51 and a second image 52 to appear in the field of view of the user 30 as shown in FIG. 2.

The first image 51 appears on a first image display area 53. The first image display area 53 is an area on the reflective optical element 4 onto which an image displayed on the first display panel 6 can be projected. In the present embodiment, the first image 51 is displayed in the forward direction not directly facing the user 30. The forward direction herein is the direction in which the movable body 20 normally moves and corresponds to the positive z-direction. In the example in FIG. 2, the first image 51 is displayed on the right of a front viewing zone that is gazed at by the user 30 driving the movable body 20. The first image 51 may not be displayed on the right but may be displayed at a position that does not obstruct the viewing zone of the user 30 during driving.

The second image 52 appears on a second image display area 54. The second image display area 54 is an area on the reflective optical element 4 onto which an image displayed on the second display panel 11 can be projected. The second image 52 is displayed in the forward direction directly facing the user 30. The first image display area 53 and the second image display area 54 may partially overlap or be adjacent to each other, but may be separate from each other.

The first projection module 2 may change the position on the first display panel 6 at which the first image is displayed. The second projection module 3 may change the position on the second display panel 11 at which the second image is displayed. Changing the position at which the first image is displayed on the first display panel 6 changes the display position of the first image 51 in the first image display area 53. Changing the position at which the second image is displayed on the second display panel 11 changes the display position of the second image 52 in the second image display area 54.

As shown in FIG. 2, the reflective optical element 4 may include a first reflective area 4a that reflects a part of incident light and transmits another part of the incident light. The first projection module 2 may project at least a part of the first image 51 onto the first reflective area 4a. The second projection module 3 may project the entire second image onto the first reflective area 4a. This allows the portion of the first image 51 in the first reflective area 4a and the second image to appear in the field of view of the user 30 in a manner superimposed on the background opposite to the user 30 from the reflective optical element 4.

The reflective optical element 4 may include a second reflective area 4b that reflects a part of incident light and substantially blocks another part of the incident light. This allows the first image and the second image projected onto the second reflective area 4b to appear clearly in the field of view of the user 30 without being superimposed on the background opposite to the user 30 from the reflective optical element 4. For example, the first projection module 2 may project a part of the first image 51 onto the second reflective area 4b. This allows the first image 51 to show information independent of information about the background.

In the HUD system 1 mounted on the movable body 20 being a vehicle, the windshield may include a lower black portion as the second reflective area 4b. The lower black portion of the windshield may be referred to as a black ceramic portion. The second reflective area 4b in the movable body 20 may be usable for displaying information from measuring instruments such as a speedometer, a tachometer, or a direction indicator, which may be located on a known instrument panel. The first reflective area 4a may be the area of the windshield excluding the lower black portion.

The first projection module 2 including the stage 7 can change the position at which the first image 51 is projected between when the first projection module 2 is in a first projection pose to project the first image 51 onto the first reflective area 4a and when the first projection module 2 is in a second projection pose to project at least a part of the first image 51 onto the second reflective area 4b. The position or the orientation of the first display panel 6 varies between the first projection pose and the second projection pose.

Microphone

The microphone detects and converts a voice into an electrical audio signal. The first microphone 81 detects the voice of the user 30. The second microphone 82 detects the voice of a passenger on the movable body 20 different from the user 30.

Camera

The camera 83 captures an image of a subject and generates an image of the subject. The camera 83 includes an image sensor. The image sensor may include, for example, a charge-coupled device (CCD) image sensor or a complementary metal-oxide-semiconductor (CMOS) image sensor. In the present embodiment, the camera 83 uses, as a subject, the passenger on the movable body 20 different from the user 30. The camera 83, the microphone, and an input unit 15 (described later) may be connected to each other with a vehicle network such as a controller area network (CAN).

Controller

The controller 5 is connected to each of the components of the HUD system 1 to control these components. The controller 5 may be, for example, a processor. The controller 5 may include one or more processors. The processors may include a general-purpose processor that reads a specific program to perform a specific function, and a processor dedicated to specific processing. The dedicated processor may include an application-specific integrated circuit (ASIC). The processor may include a programmable logic device (PLD). The PLD may include a field-programmable gate array (FPGA). The controller 5 may be either a system on a chip (SoC) or be a system in a package (SiP) in which one or more processors cooperate with other components.

The controller 5 includes a memory. The memory includes any storage device such as a random-access memory (RAM) or a read-only memory (ROM). The memory may store any programs and information for various processes. For example, the memory may store, as the first image and the second image, display items to be displayed. Examples of display items include text, graphics, and animations combining text and graphics.

In the HUD system 1 shown in FIG. 1, the controller 5 is separate from the first projection module 2 and the second projection module 3. Instead of this structure, the functions of the controller 5 may be distributed in the first projection module 2 and the second projection module 3. The controller 5 for the first projection module 2 and the controller 5 for the second projection module 3 may cooperate with each other. In this case, the functions of the controller 5 may be included in the first projection module 2 and the second projection module 3.

Input Unit

The HUD system 1 may include the input unit 15 that obtains information from the microphone, the camera 83, and an external device. For the HUD system 1 mounted on the movable body 20, the input unit 15 can obtain information from an electronic control unit (ECU) 21 in the movable body 20. The ECU 21 is a computer that electronically controls various devices mounted on the movable body 20. The ECU 21 may control, for example, an engine, a navigation system, or an audio system. The controller 5 may obtain the voice of the passenger detected by the second microphone 82 through the input unit 15. The controller 5 may obtain an image of the passenger captured by the camera 83 through the input unit 15. The controller 5 may obtain a song list in the audio system controlled by the ECU 21 through the input unit 15. The controller 5 may obtain an image displayed on a center information display (CID) controlled by the ECU 21 through the input unit 15.

Speaker

The HUD system 1 may include a speaker that converts an input audio signal into a voice and outputs the voice. In the present embodiment, the speaker includes a first speaker 84 and a second speaker 85. The speaker obtains an audio signal from the controller 5. The first speaker 84 outputs a voice to the user 30. The second speaker 85 outputs a voice to the passenger on the movable body 20.

Display Item

The HUD system 1 can display a wide variety of display items as the first image 51 in response to a voice instruction from the user 30. The controller 5 performs voice recognition with an audio signal and sets the information about the first image in accordance with an instruction associated with the voice recognition. The controller 5 obtains an audio signal representing the instruction from the user 30 from the first microphone 81. The controller 5 may determine the details of the instruction from the user 30 by performing voice recognition using, for example, an acoustic model, a language model, and a dictionary to associate the audio signal with characters. The controller 5 may generate, for example, an image of a virtual person and display the image as the first image 51, as shown in FIG. 2. The virtual person may be a virtual assistant that assists the user 30 in performing an operation for displaying an intended display item. The controller 5 may generate a voice carrying a response or confirmation to the user 30 from the first speaker 84 in response to the voice of the user 30. The controller 5 may select a voice message to be generated using, for example, a list of response patterns and a dictionary. The controller 5 may change the facial expressions of the virtual person in the first image 51 in accordance with the details of the response. The controller 5 functions as a speech recognition device and an auto-response device as described above to allow the HUD system 1 to respond to an instruction through an interactive conversation with the user 30. The HUD system 1 may display the virtual person as the first image 51 for the user 30 to select a display item. For example, the controller 5 may generate a voice message stating "What is your request? " from the first speaker 84 while displaying the virtual person as the first image 51. For example, the controller 5 may generate a voice message stating "All right" from the first speaker 84 while displaying the virtual person as the first image 51. The controller 5 may display the virtual person in the first image 51 until the user 30 selects a display item to be displayed.

The controller 5 may display an image of a person different from the user 30 captured by the camera 83 in the first image 51 in accordance with a voice instruction from the user 30. When, for example, the user 30 intends to have a conversation with the passenger on the movable body 20, the user 30 may generate a voice instruction to the virtual assistant in the first image 51 stating that "I would like to have a conversation with a passenger." The controller 5 may display the image of the passenger captured by the camera 83 in the first image 51. The controller 5 controls the voice of the passenger detected by the second microphone 82 to be output from the first speaker 84 to the user 30 and the voice of the user 30 detected by the first microphone 81 to be output from the second speaker 85 to the passenger. The person different from the user 30 may not be a passenger on the movable body 20. When, for example, the movable body 20 includes a communicator controllable by the controller 5, the person different from the user 30 may be a person outside the movable body 20 who can perform bidirectional communication of an image signal and an audio signal through the communicator.

The controller 5 may display an image generated by the ECU 21 in the movable body 20 in the first image 51 in accordance with a voice instruction from the user 30. When, for example, the user 30 intends to select a song in the audio system, the user 30 may generate a voice instruction to the virtual assistant in the first image 51 stating that "I would like to select a song." The controller 5 causes the ECU 21 controlling the audio system to generate an image of the song list and obtains the image of the song list through the input unit 15 and displays the image on the first image 51. In response to the user 30 selecting a song in the song list with a voice, the controller 5 may perform voice recognition and output information about the selected song to the ECU 21. The ECU 21 may cause the audio system to play the song selected by the user 30.

When, for example, the user 30 intends to check the image on the CID without greatly moving the gaze, the user 30 may generate a voice instruction to the virtual assistant in the first image 51 stating "I would like to check the CID." The controller 5 obtains an image on the CID from the ECU 21 through the input unit 15 and displays the image on the first image 51.

Parallax Image

Figure 3:
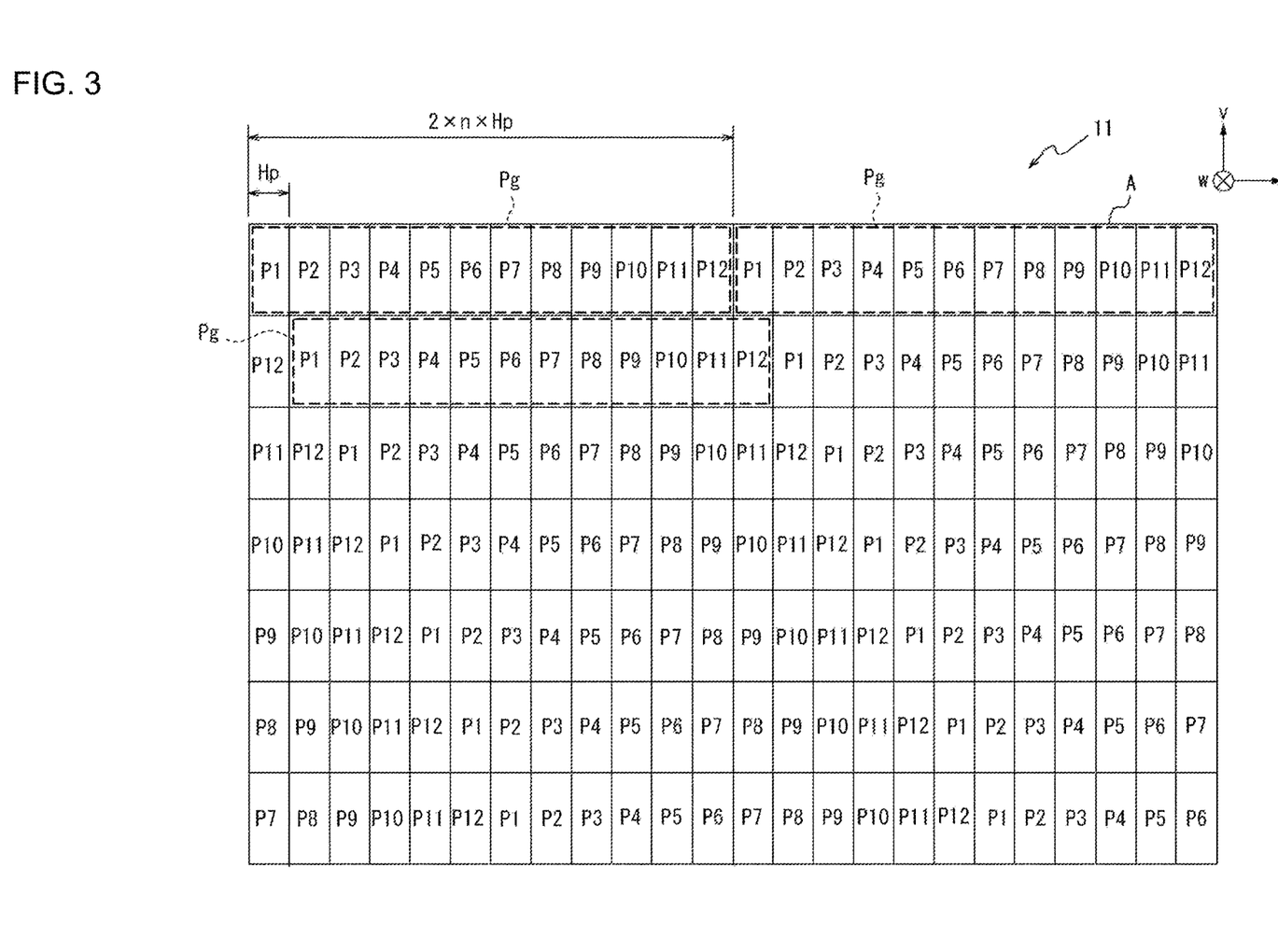
FIG. 3 is a diagram of an example display panel shown in FIG. 1 viewed in a depth direction.

As described above, the second display panel 11 can display a parallax image to allow a user to view a 3D image. As shown in FIG. 3, the second display panel 11 includes a planar active area A including multiple divisional areas. The active area A can display a parallax image. The parallax image includes a left eye image and a right eye image (described later). The right eye image has parallax with respect to the left eye image. In FIG. 3, the divisional areas are defined in u-direction and in v-direction orthogonal to u-direction. The direction orthogonal to u-direction and v-direction is referred to as w-direction. The u-direction may be referred to as a horizontal direction. The v-direction may be referred to as a vertical direction. The w-direction may be referred to as a depth direction. The u-direction is the direction corresponding to the parallax direction of the user 30.

Each divisional area corresponds to a subpixel. Thus, the active area A includes multiple subpixels arranged in a lattice in u-direction and v-direction. Each subpixel has one of the colors red (R), green (G), and blue (B). One pixel may be a set of three subpixels with R, G, and B. One pixel may include four or any other number of subpixels, instead of three subpixels. One pixel may include subpixels with a combination of colors different from R, G, and B. A pixel may be referred to as a picture element. For example, multiple subpixels included in one pixel may be arranged in the horizontal direction. Multiple subpixels having the same color may be arranged, for example, in the vertical direction.

The multiple subpixels arranged in the active area A form subpixel groups Pg under control by the controller 5. Multiple subpixel groups Pg are arranged repeatedly in u-direction. Each subpixel group Pg may be aligned with or shifted from the corresponding subpixel group Pg in v-direction. For example, the subpixel groups Pg are repeatedly arranged in v-direction at positions shifted by one subpixel in u-direction from the corresponding subpixel group Pg in adjacent rows. The subpixel groups Pg each include multiple subpixels in predetermined rows and columns. More specifically, the multiple subpixel groups Pg each include $(2 \times n \times b)$ subpixels P1 to PN ($N=2 \times n \times b$), which are consecutively arranged in b rows in v-direction and in $(2 \times n)$ columns in u-direction. In the example shown in FIG. 3, n is 6, and b is 1. The active area A shown in FIG. 3 includes the subpixel groups Pg each including 12 subpixels P1 to P12 consecutively arranged in one row in v-direction and in 12 columns in u-direction. In the example shown in FIG. 3, some of the subpixel groups Pg are denoted by reference signs.

Each subpixel group Pg is the smallest unit controllable by the controller 5 to display an image. The subpixels included in each subpixel group Pg are identified using identification reference signs P1 to PN (N=2×n×b). The subpixels P1 to PN (N=2×n×b) included in each subpixel group Pg with the same identification reference signs are controlled by the controller 5 at the same time. Being controlled at the same time includes being controlled simultaneously and substantially simultaneously. Being controlled at the same time includes being controlled based on the same single clock and in the same frame. For example, the controller 5 can switch the image to be displayed by the subpixels P1 from the left eye image to the right eye image at the same time in all the subpixel groups Pg.

As shown in FIG. 1, the parallax optical element 12 extends along the second display panel 11. The parallax optical element 12 is separate from the active area A in the second display panel 11 by a gap g, or a distance. The parallax optical element 12 may be located opposite to the illuminator 10 from the second display panel 11. The parallax optical element 12 may be located between the second display panel 11 and the illuminator 10.

Figure 4:
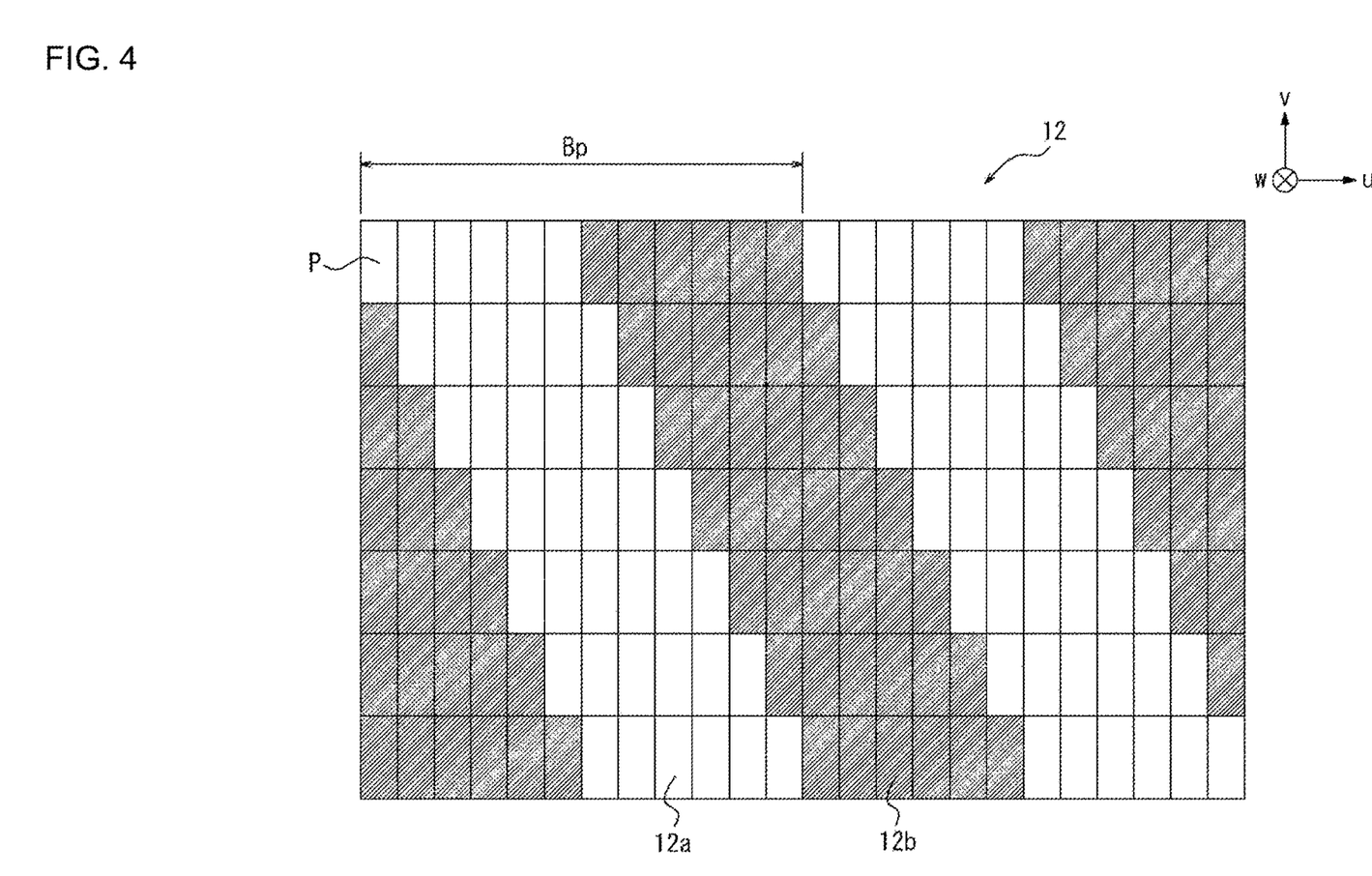
FIG. 4 is a diagram of an example parallax optical element shown in FIG. 1 viewed in the depth direction.

The parallax optical element 12 can define the traveling direction of image light emitted from the multiple subpixels. The parallax optical element 12 can substantially define the viewing zone 32 for a parallax image. The viewing zone 32 is the range of space from which the left eye 31l and the right eye 31r of the user 30 can view the parallax image as a 3D image. In one example, the parallax optical element 12 is a liquid crystal shutter as shown in FIG. 4. Similarly to the second display panel 11, the liquid crystal shutter includes multiple pixels P. The parallax optical element 12 being a liquid crystal shutter can control the light transmittance of each pixel P. Each pixel P in the parallax optical element 12 can switch between a high light-transmittance state and a low light-transmittance state. A pixel P with a higher light transmittance may be hereafter referred to as an open pixel. The multiple pixels P included in the parallax optical element 12 may correspond to the multiple subpixels included in the second display panel 11. The multiple pixels P in the parallax optical element 12 differ from the subpixels in the second display panel 11 in that the pixels P have no color components.

The parallax optical element 12 includes multiple transmissive portions 12a and multiple light-reducing portions 12b as controlled by the controller 5. For the parallax optical element 12 being a liquid crystal shutter, the transmissive portions 12a include pixels P with a higher light transmittance, and the light-reducing portions 12b include pixels P with a lower light transmittance. The light-reducing portions 12b are strip areas extending in a predetermined direction in the plane of the parallax optical element 12. The light-reducing portions 12b define transmissive portions 12a between adjacent light-reducing portions 12b. The transmissive portions 12a and the light-reducing portions 12b extend in a predetermined direction along the active area A. The transmissive portions 12a and the light-reducing portions 12b are arranged alternately in a direction orthogonal to the predetermined direction. The transmissive portions 12a have a higher light transmittance than the light-reducing portions 12b. The transmissive portions 12a may have a light transmittance 10 or more times, or 100 or more times, or 1000 or more times the light transmittance of the light-reducing portions 12b. The light-reducing portions 12b have a lower light transmittance than the transmissive portions 12a. The light-reducing portions 12b may block image light.

The direction in which the transmissive portions 12a and the light-reducing portions 12b extend may correspond to the direction in which the subpixel groups Pg in the second display panel 11 are arranged. The parallax optical element 12 is controlled to simultaneously cause subpixels in the subpixel groups Pg identified with the same identification reference signs P1 to P12 to be light-transmissive or light-reducing as viewed with the left eye 31l and the right eye 31r of the user 30.

Figure 5:
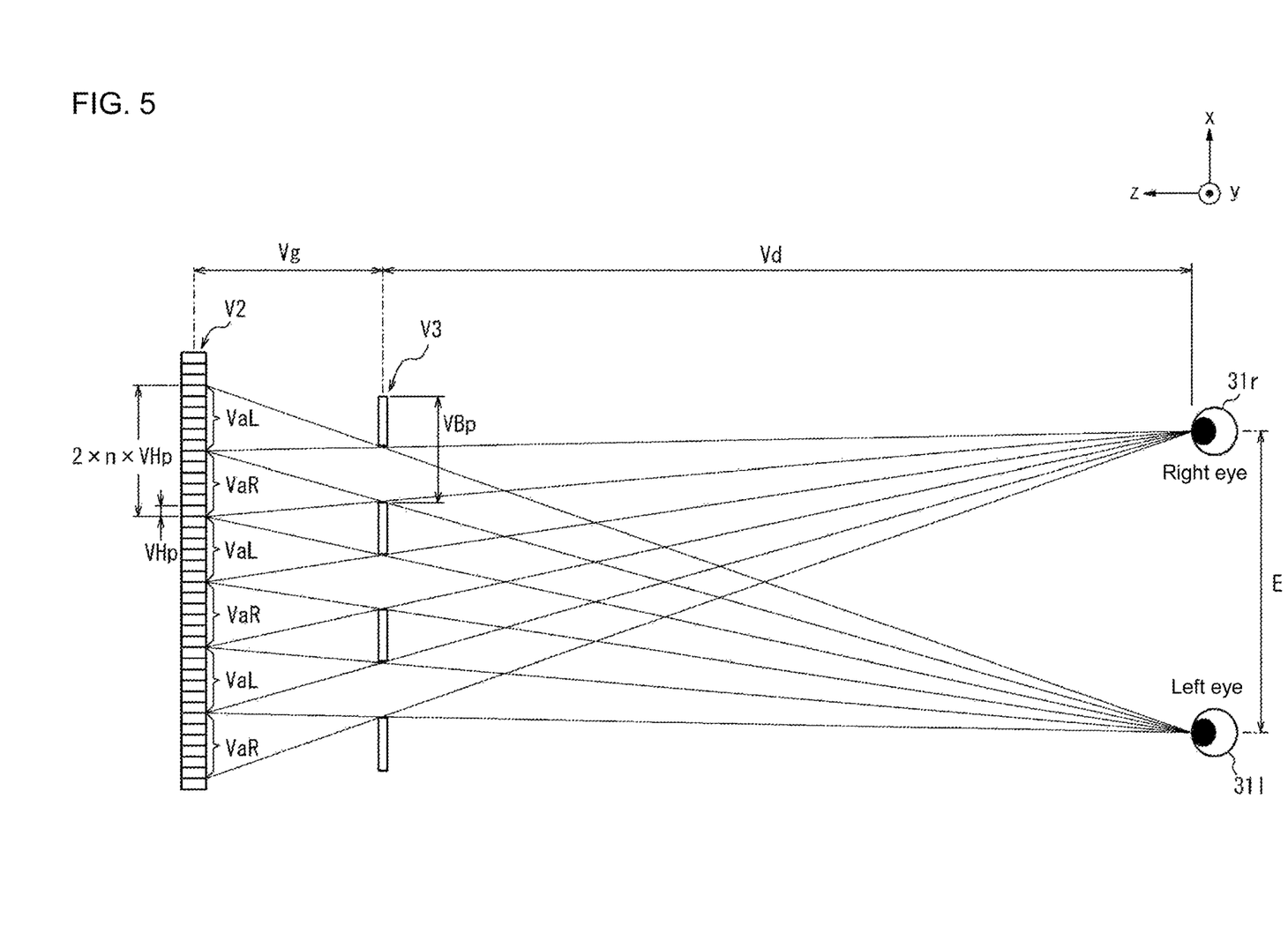
FIG. 5 is a diagram describing the relationship between a virtual image and a user's eyes shown in FIG. 1.

Image light from the second image emitted from the active area A on the second display panel 11 partially transmits through the transmissive portions 12a and reaches the reflective optical element 4 through the optical system 9. The image light reaching the reflective optical element 4 is reflected by the reflective optical element 4 and reaches the left eye 31l and the right eye 31r of the user 30. This allows the left eye 31l and the right eye 31r of the user 30 to view, as a virtual image of an image appearing on the active area A, a second virtual image V2 frontward from the reflective optical element 4. Being frontward herein refers to z-direction. As shown in FIG. 5, the user 30 perceives an image including a third virtual image V3 that is a virtual image of the parallax optical element 12 appearing to define the direction of image light from the second virtual image V2.

The user 30 thus views the image appearing as the second virtual image V2 through the third virtual image V3. In reality, the user 30 does not view the third virtual image V3, or a virtual image of the parallax optical element 12. However, the third virtual image V3 is hereafter referred to as appearing at the position at which the virtual image of the parallax optical element 12 is formed and as defining the traveling direction of image light from the second virtual image V2. Areas in the second virtual image V2 viewable by the user 30 with image light reaching the position of the left eye 31l of the user 30 are hereafter referred to as left viewable areas VaL. Areas in the second virtual image V2 viewable by the user 30 with image light reaching the position of the right eye 31r of the user 30 are referred to as right viewable areas VaR.

As shown in FIG. 5, a virtual image barrier pitch VBp and a virtual image gap Vg are determined to satisfy Formula 1 and Formula 2 below using an optimum viewing distance Vd.

$$E:Vd=(n\times VHp):Vg \quad (1)$$

$$Vd:VBp=(Vdv+Vg):(2\times n\times VHp) \quad (2)$$

The virtual image barrier pitch VBp is the interval in x-direction at which the light-reducing portions 12b projected as the third virtual image V3 are arranged in a direction corresponding to u-direction. The virtual image gap Vg is the distance between the third virtual image V3 and the second virtual image V2. The optimum viewing distance Vd is the distance between the position of the left eye 31l or the right eye 31r of the user 30 and the third virtual image V3, or a virtual image of the parallax optical element 12. An interocular distance E is the distance between the left eye 31l and the right eye 31r. The interocular distance E may be, for example, 61.1 to 64.4 mm, as calculated through studies conducted by the National Institute of Advanced Industrial Science and Technology. VHp is the horizontal length of each subpixel of the virtual image.

VHp is the length of each subpixel of the second virtual image V2 in a direction corresponding to x-direction.

As described above, the left viewable areas VaL in FIG. 5 are defined on the second virtual image V2 and viewable by the left eye 311 of the user 30 when image light transmitted through the transmissive portions 12a of the parallax optical element 12 reaches the left eye 311 of the user 30. As described above, the right viewable areas VaR are defined on the second virtual image V2 and viewable by the right eye 31r of the user 30 when image light transmitted through the transmissive portions 12a of the parallax optical element 12 reaches the right eye 31r of the user 30.

Figure 6:
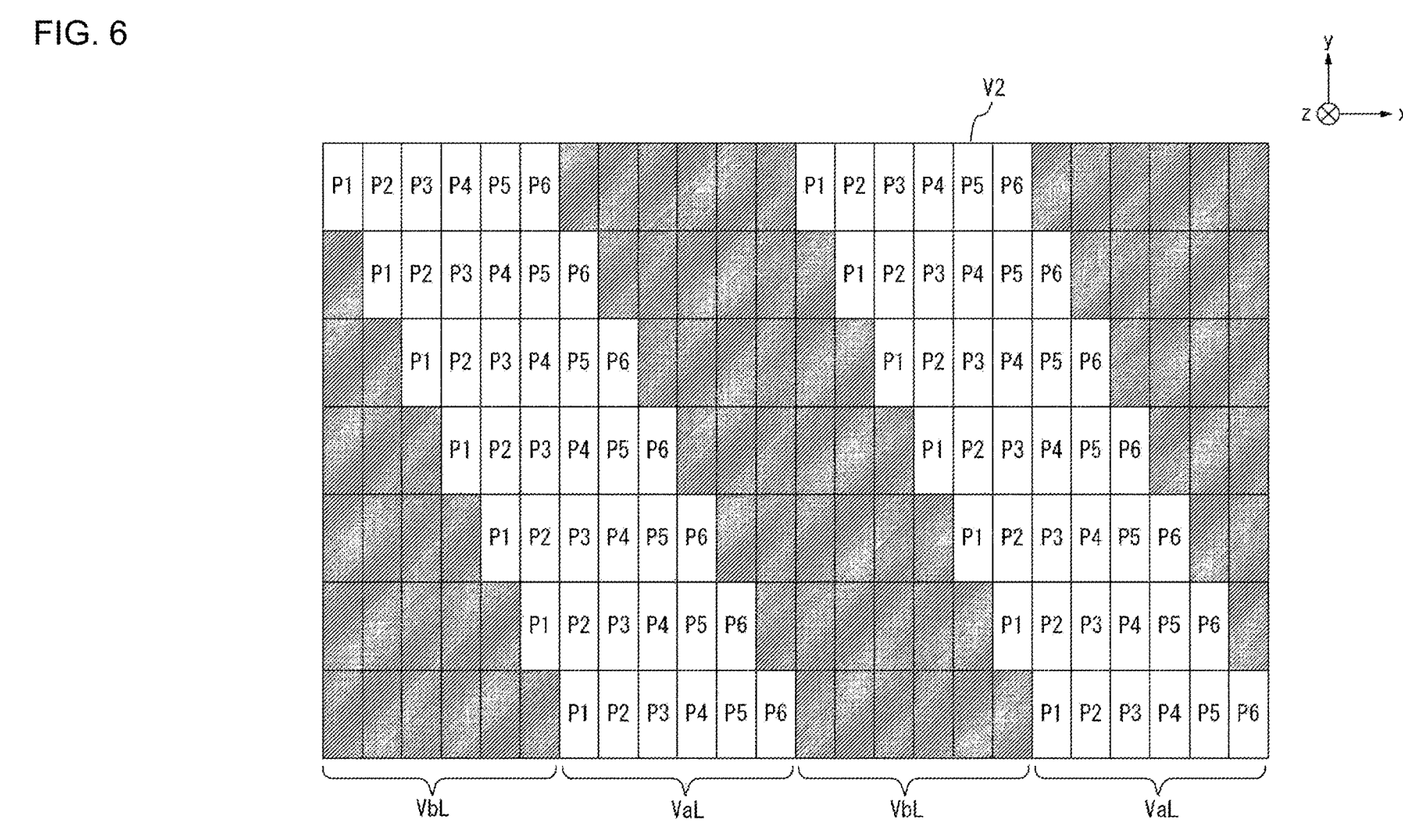
FIG. 6 is a diagram showing an area viewable with a left eye in the virtual image for the display panel.

FIG. 6 shows an example array of subpixels of the second virtual image V2 as viewed with the left eye 311 of the user 30 using the parallax optical element 12 with an aperture ratio of 50%. The subpixels on the second virtual image V2 are denoted by the same identification reference signs P1 to P12 as the subpixels shown in FIG. 3. The parallax optical element 12 with an aperture ratio of 50% includes the transmissive portions 12a and the light-reducing portions 12b each having the same width in the interocular direction (x-direction). The second virtual image V2 includes left light-reducing areas VbL with light reduced by the third virtual image V3. The left light-reducing areas VbL are less easily viewable with the left eye 311 of the user 30 when the image light is reduced by the light-reducing portions 12b on the parallax optical element 12.

Figure 7:
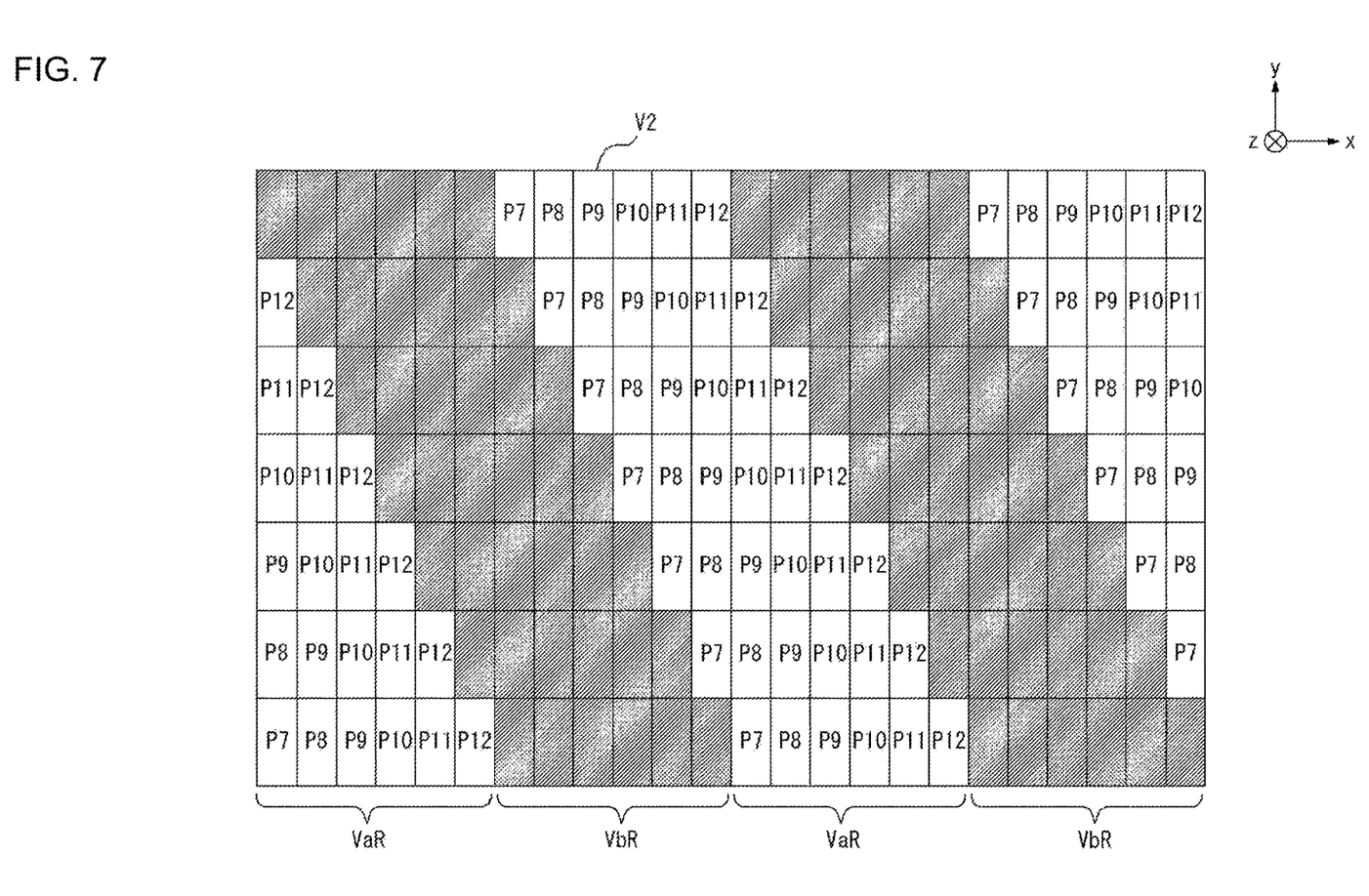
FIG. 7 is a diagram showing an area viewable with a right eye in the virtual image for the display panel.

FIG. 7 shows an example array of subpixels of the second virtual image V2 viewed with the right eye 31r of the user 30 when the left viewable areas VaL and the left light-reducing areas VbL located as shown in FIG. 6 are viewed with the left eye 311 of the user 30. The second virtual image V2 includes right light-reducing areas VbR with light reduced by the third virtual image V3. The right light-reducing areas VbR are less easily viewable with the right eye 31r of the user 30 when the image light is reduced by the light-reducing portions 12b on the parallax optical element 12.

With the parallax optical element 12 having an aperture ratio of 50%, the left viewable areas VaL may match the right light-reducing areas VbR, and the right viewable areas VaR may match the left light-reducing areas VbL. With the parallax optical element 12 having an aperture ratio of less than 50%, the left viewable areas VaL may be included in the right light-reducing areas VbR, and the right viewable areas VaR may be included in the left light-reducing areas VbL. Thus, the right viewable areas VaR are not easily viewable with the left eye 311, and the left viewable areas VaL are not easily viewable with the right eye 31r.

In the example shown in FIGS. 6 and 7, each left viewable area VaL includes the virtual image of each of the subpixels P1 to P6 arranged in the active area A. The virtual image of the subpixels P7 to P12 arranged in the active area A is less easily viewable with the left eye 311 of the user 30. Each right viewable area VaR includes the virtual image of each of the subpixels P7 to P12 arranged in the active area A. The virtual image of the subpixels P1 to P6 arranged in the active area A is less easily viewable with the right eye 31r of the user 30. The controller 5 can cause the subpixels P1 to P6 to display the left eye image. The controller 5 can cause the subpixels P7 to P12 to display the right eye image. This allows the left eye 311 of the user 30 to view the virtual image of the left eye image on the left viewable areas VaL and allows the right eye 31r of the user 30 to view the virtual image of the right eye image on the right viewable areas VaR. As described above, the right eye image and the left eye image are parallax images having parallax between them. The user 30 can thus view the right eye image and the left eye image as a 3D image.

A change in the positions of the eyes 31 of the user 30 changes the parts of the subpixels P1 to P12 used to display the virtual image viewable with the left eye 311 and the right eye 31r of the user 30. The HUD system 1 may further include a detector 13 for detecting the positions of the left eye 311 and the right eye 31r of the user 30. The detector 13 outputs the detected positions of the left eye 311 and the right eye 31r of the user 30 to the controller 5. The detector 13 may include an imaging device or a sensor. For the HUD system 1 mounted on the movable body 20 being a vehicle, the detector 13 may be installed in any of various places such as on a rearview mirror, an instrument panel, a steering wheel, or a dashboard.

For the detector 13 including an imaging device, the imaging device captures a subject and generates an image of the subject. The imaging device includes an image sensor. The image sensor may include, for example, a CCD image sensor or a CMOS image sensor. The imaging device is arranged to have the face of the user 30 being at the position of the subject. For example, the detector 13 may define a predetermined position as the origin and detect the direction and amount of displacements of the eyes 31 from the origin. The detector 13 may detect, with two or more imaging devices, the position of at least one of the left eye 311 and the right eye 31r as the coordinates in a 3D space.

The detector 13 may include no imaging device and may be connected to an external imaging device. The detector 13 may include an input terminal for receiving signals from the external imaging device. The external imaging device may be directly connected to the input terminal. The external imaging device may be connected to the input terminal indirectly through a shared network.

For the detector 13 including a sensor, the sensor may be an ultrasonic sensor or an optical sensor.

The controller 5 may obtain positional information about the left eye 311 and the right eye 31r of the user 30 from the detector 13 through an obtainer 14. The obtainer 14 can obtain positional information about the left eye 311 and the right eye 31r of the user 30 detected by the detector 13. The detector 13 and the obtainer 14 are connected to each other through wired or wireless communication or both. For the movable body 20 being a vehicle, the detector 13 and the obtainer 14 may be connected to each other with a vehicle network such as a CAN. The obtainer 14 may include a connector for wired communication, such as an electrical connector or an optical connector. The obtainer 14 may include an antenna for wireless communication.

The controller 5 controls, based on the position of the left eye 311 of the user 30, the parallax optical element 12 to allow the subpixels P1 to P6 displaying the left eye image to be viewed by the left eye 311. The controller 5 controls, based on the position of the right eye 31r of the user 30, the parallax optical element 12 to allow the subpixels P7 to P12 displaying the right eye image to be viewed by the right eye 31r.

Figure 8:
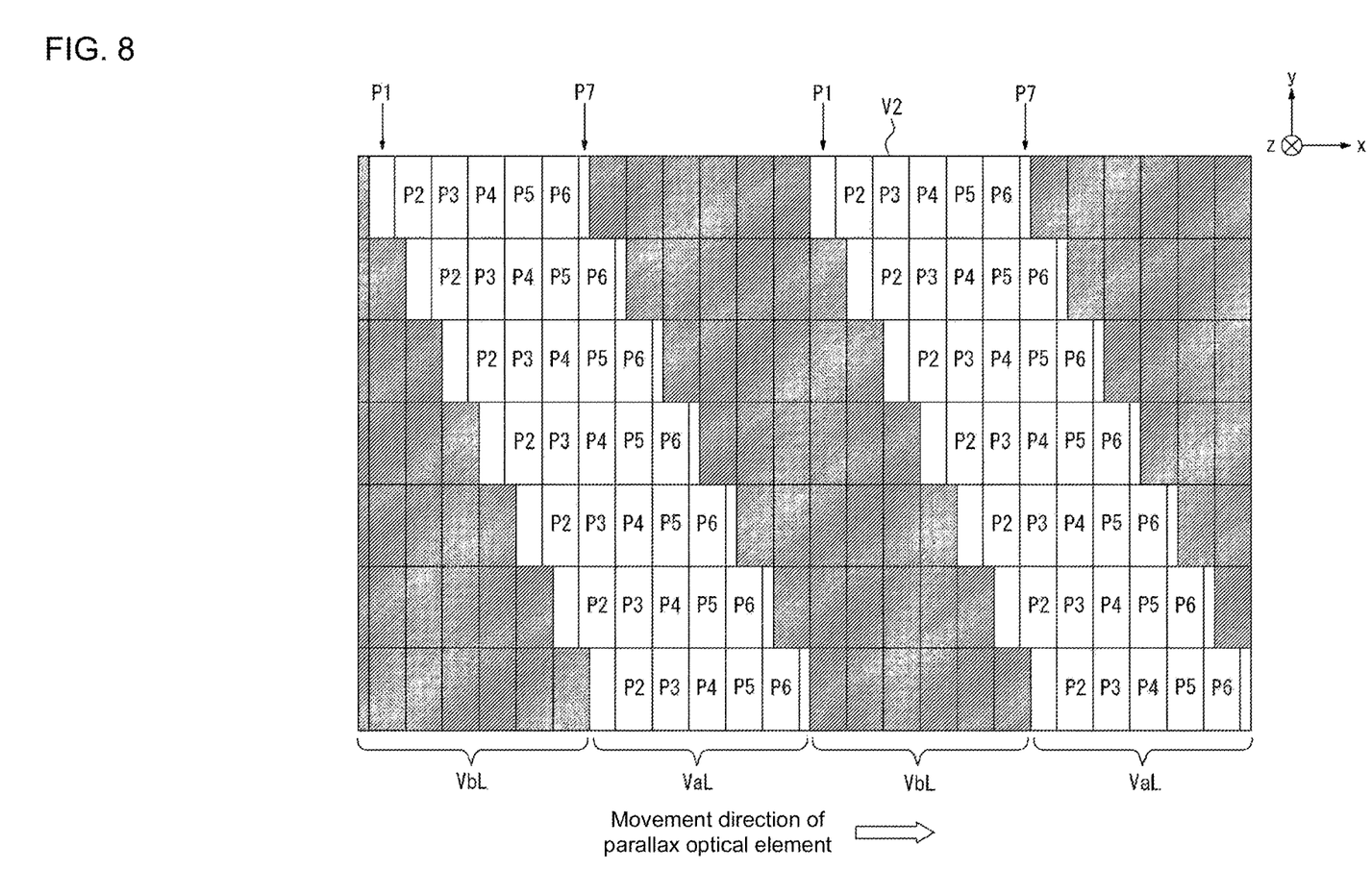
FIG. 8 is a diagram describing switching of the parallax optical element in response to a change in the positions of the user's eyes.

For example, the left eye 311 and the right eye 31r of the user 30 observing the second virtual image V2 as shown in FIGS. 6 and 7 may move relatively to the left. This causes the third virtual image V3 that is a virtual image of the parallax optical element 12 to appear to move to the right. FIG. 8 shows the second virtual image V2 when the left eye 311 of the user 30 has moved to the left from the state shown in FIG. 6. As the left eye 311 of the user 30 moves to the left, the left viewable areas VaL and the left light-reducing areas VbL move to the right.

In the example shown in FIG. 8, each left viewable area VaL includes the full area of each of the subpixels P2 to P6 and a part of each of the subpixels P1 and P7. Each right viewable area VaR includes the full area of each of the subpixels P8 to P12 and a part of each of the subpixels P7 and P1. The controller 5 controls the parallax optical element 12 to cause each left viewable area VaL to include a maximum area of each of the subpixels P1 to P6 displaying the left eye image. For example, in response to the left eye 31l of the user 30 moving further to the left from the state shown in FIG. 8, causing each left viewable area VaL to include a larger area of each subpixel P7 than the area of each subpixel P1, the controller 5 may switch open pixels P in the parallax optical element 12. In this case, the controller 5 switches, to open pixels, pixels with a lower light transmittance in the parallax optical element 12 for which virtual images are located adjacent to the left of the left viewable areas VaL. The controller 5 switches, to pixels with a lower light transmittance, open pixels in the parallax optical element 12 for which virtual images are located adjacent to the left of the left viewable areas VaL. The controller 5 switches open pixels P to maintain the subpixels P1 to P6 displaying the left eye image to be most easily viewable by the left eye 31l of the user 30. The controller 5 controls the parallax optical element 12 for the right eye 31r in the same manner.

The HUD system 1 with the structure described above according to one or more embodiments of the present disclosure can display a variety of display items as the first image 51 in response to a voice instruction from the user 30. In other words, the HUD system 1 and the movable body 20 according to one or more aspects of the present disclosure can display a variety of display items. The first image 51 is displayed in the forward direction not directly facing the user 30. The first image 51 is displayed at a position to avoid the front viewing zone of the user 30. The first image 51 thus does not obstruct the front of the user 30.

Other Embodiments

The above embodiments are described as typical examples. Various modifications and substitutions to the embodiments are apparent to those skilled in the art without departing from the spirit and scope of the present disclosure. Thus, the above embodiments should not be construed to be restrictive, but may be variously modified or altered within the scope of the present disclosure. For example, multiple structural blocks described in the above embodiments or examples may be combined into a structural block, or each structural block may be divided. The embodiments of the present disclosure can also be implemented as a method or a program implementable by a processor included in the device, or as a storage medium storing the program. These method, program, and storage medium also fall within the scope of the present disclosure.

In one or more embodiments of the present disclosure, the second projection module 3 includes a liquid crystal shutter as a parallax optical element. The parallax optical element is not limited to a liquid crystal shutter but may be another optical element that can substantially define the viewing zone for the parallax image. For example, the parallax optical element may be a parallax barrier plate with slits that are arranged parallel to one another. The slits allow transmission of the right eye image in the parallax image along the optical path toward the right eye and the left eye image toward the left eye. For the parallax optical element being the parallax barrier with fixed openings as described above, the controller 5 may switch, based on the movement of the head of the user 30, between subpixels displaying the left eye image and subpixels displaying the right eye image on the second display panel 11. In this manner, the controller 5 can continue displaying a 3D image for the user 30 independently of any displacements of the eyes of the user 30.

The parallax optical element may include multiple lenticular lenses arranged parallel to one another into a flat surface. The lenticular lenses can deflect the left eye image and the right eye image in the parallax image alternately displayed on the second display panel respectively to the optical path toward the right eye and the optical path toward the left eye.

The second projection module 3 may be switchable between a first state for displaying a 3D image and a second state for displaying a 2D image. In the first state, the controller 5 displays a parallax image on the second display panel 11 and displays, on the parallax optical element 12, the transmissive portions 12a and the light-reducing portions 12b for defining the traveling direction of image light. In the second state, the controller 5 displays a 2D image representing a 2D image on the second display panel 11 and causes the parallax optical element 12 to be entirely in a light transmission state to transmit image light uniformly. The controller 5 performs control to synchronize the switching of the states of the second display panel 11 and the parallax optical element 12. This allows the second projection module 3 to select either a 2D image or a 3D image as appropriate and display the image for the user 30.

The present disclosure may be implemented in the following forms.

A head-up display system according to one embodiment of the present disclosure includes a first projection module that projects a first image to display the first image in a forward direction not directly facing a user, a second projection module that projects a second image to display the second image in a forward direction directly facing the user, and a reflective optical element that reflects at least a part of the first image and at least a part of the second image.

A movable body according to one embodiment of the present disclosure includes a head-up display system. The head-up display system includes a first projection module that projects a first image to display the first image in a forward direction not directly facing a user, a second projection module that projects a second image to display the second image in a forward direction directly facing the user, and a reflective optical element that reflects at least a part of the first image and at least a part of the second image.

The head-up display system and the movable body according to one or more embodiments of the present disclosure display a variety of display items.

Although embodiments of the present disclosure have been described in detail, the present disclosure is not limited to the embodiments described above, and may be changed or modified in various manners without departing from the spirit and scope of the present disclosure. The components described in the above embodiments may be entirely or partially combined as appropriate unless any contradiction arises.

REFERENCE SIGNS LIST 1 head-up display system (HUD system)
2 first projection module
3 second projection module
4 reflective optical element
4a first reflective area
4b second reflective area 5 controller
6 first display panel
7 stage
8 display device
9 optical system
10 illuminator
11 second display panel
12 parallax optical element
13 detector
14 obtainer
15 input unit
17 drive
18 glass cover
20 movable body
21 electronic control unit (ECU)
30 user
31 eye
31l left eye
31r right eye
32 viewing zone
51 first image
52 second image
53 first image display area
54 second image display area
81 first microphone
82 second microphone
83 camera
84 first speaker
85 second speaker
A active area
P pixel
Pg subpixel group
V1 first virtual image
V2 second virtual image
V3 third virtual image
VaL left viewable area
VbL left light-reducing area
VaR right viewable area
VbR right light-reducing area

The invention claimed is:

1. A head-up display system comprising:
a movable body comprising a windshield having an upper portion and a lower portion, wherein the upper portion is transparent to a background opposite to a user of the movable body and the lower portion substantially blocks the background opposite to the user of the movable body;
a first projection module configured to project a first image to display the first image in a forward direction not directly facing a user;
a second projection module configured to project a second image to display the second image in a forward direction directly facing the user; and
a reflective optical element configured to reflect at least a part of the first image and at least a part of the second image;
a controller configured to perform bidirectional communication of an image signal and an audio signal with a person outside the movable body, the controller further configured to control the first projection module to display, as the first image, an image of the person outside the movable body in accordance with the image signal, and the controller further configured to control the second projection module to display, as the second image, an image relating to a navigation system, wherein the displayed first image is larger than the displayed second image,
the displayed first image is projected on the windshield so that a first part of the displayed first image overlaps the lower portion of the windshield that substantially blocks the background opposite to the user of the movable body and a remaining part of the displayed first image overlaps the upper portion of the windshield that is transparent to the background opposite to the user of the movable body, and
the displayed second image is projected on the windshield so that the displayed second image overlaps only the upper portion of the windshield.

2. The head-up display system according to claim 1, wherein
the first projection module includes a first display panel configured to display the first image toward the reflective optical element, and
the second projection module includes
a second display panel configured to display the second image, and
an optical system configured to direct the second image toward the reflective optical element.

3. The head-up display system according to claim 2, wherein the first display panel is installable on a surface of a dashboard in the movable body on which the head-up display system is mountable.

4. The head-up display system according to claim 2, wherein
the second display panel is configured to display a parallax image as the second image, and
the second projection module includes a parallax optical element configured to substantially define a viewing zone of the parallax image.

5. The head-up display system according to claim 1, further comprising:
a first microphone configured to detect a first voice of the user and convert the voice to an electrical audio signal;
a second microphone configured to detect a second voice of a passenger in the movable body who is not the user and convert the second voice to an electrical audio signal; and
wherein the controller is further configured to perform voice recognition on the electrical audio signal of the first voice and set information about the first image in accordance with an instruction associated with the voice recognition of the first voice.

6. The head-up display system according to claim 5, wherein the first image includes an image of a virtual person generated by the controller.

7. The head-up display system according to claim 5, further comprising:
a camera configured to capture an image of a person different from the user,
wherein the first image includes the image of the person different from the user captured by the camera.

8. The head-up display system according to claim 7, wherein the person different from the user includes a passenger on the movable body on which the head-up display system is mountable.

9. The head-up display system according to claim 5, wherein the first image includes an image generated by an electronic control unit included in the movable body on which the head-up display system is mountable.

10. The head-up display system according to claim 1, wherein the reflective optical element includes a first reflective area to reflect a part of incident light and transmit another part of the incident light, the first projection module is further configured to project at least a part of the first image onto the first reflective area, and the second projection module is further configured to project an entire part of the second image onto the first reflective area.

11. The head-up display system according to claim 10, wherein the reflective optical element includes a second reflective area to reflect a part of incident light and substantially block another part of the incident light.

12. The head-up display system according to claim 11, wherein the first projection module is further configured to project a part of the first image onto the second reflective area.

13. A movable body comprising:
a windshield having an upper portion and a lower portion, wherein the upper portion is transparent to a background opposite to a user of the movable body and the lower portion substantially blocks the background opposite to the user of the movable body;
a head-up display system including:
　a first projection module configured to project a first image to display the first image in a forward direction not directly facing a user;
　a second projection module configured to project a second image to display the second image in a forward direction directly facing the user; and
a controller configured to perform bidirectional communication of an image signal and an audio signal with a person outside the movable body, the controller further configured to control the first projection module to display, as the first image, an image of the person outside the movable body in accordance with the image signal, and the controller further configured to control the second projection module to display, as the second image, an image relating to a navigation system, wherein
the displayed first image is projected on the windshield so that a first part of the displayed first image overlaps the lower portion of the windshield that substantially blocks the background opposite to the user of the movable body and a remaining part of the displayed first image overlaps the upper portion of the windshield that is transparent to the background opposite to the user of the movable body, and
the displayed second image is projected on the windshield so that the displayed second image overlaps only the upper portion of the windshield.

14. The movable body according to claim 13, further comprising:
a first microphone configured to detect a first voice of the user and convert the voice to an electrical audio signal;
a second microphone configured to detect a second voice of a passenger in the movable body who is not the user and convert the second voice to an electrical audio signal; and
wherein the controller is further configured to perform voice recognition on the electrical audio signal of the first voice and set information about the first image in accordance with an instruction associated with the voice recognition of the first voice.

* * * * *